C. A. ALLEN.
CARD FLEECE WIDTH CONTROLLER.
APPLICATION FILED AUG. 21, 1912.
1,152,389.
Patented Sept. 7, 1915.
8 SHEETS—SHEET 1.
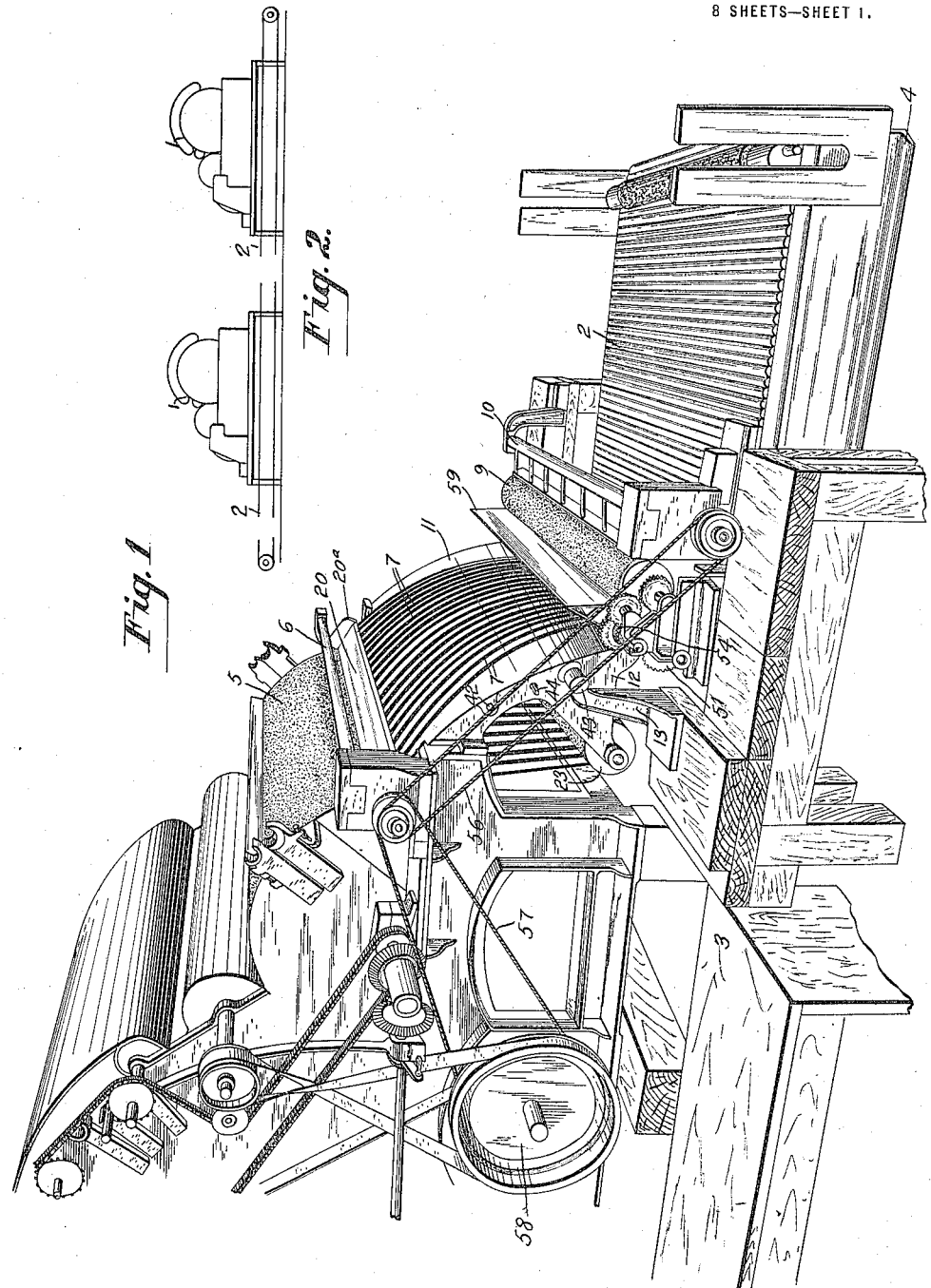
WITNESSES
INVENTOR
Charles A. Allen
BY
ATTORNEYS

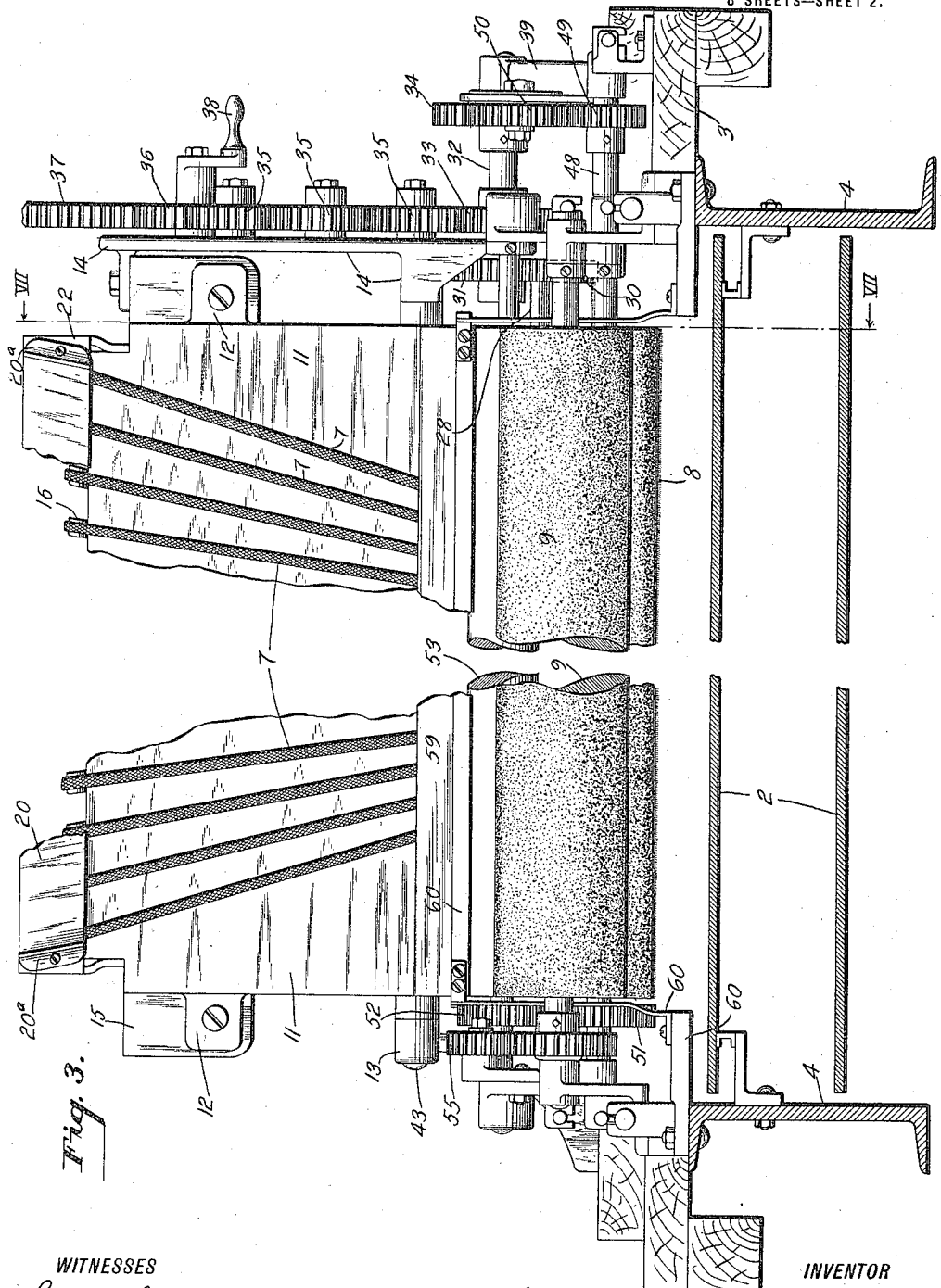

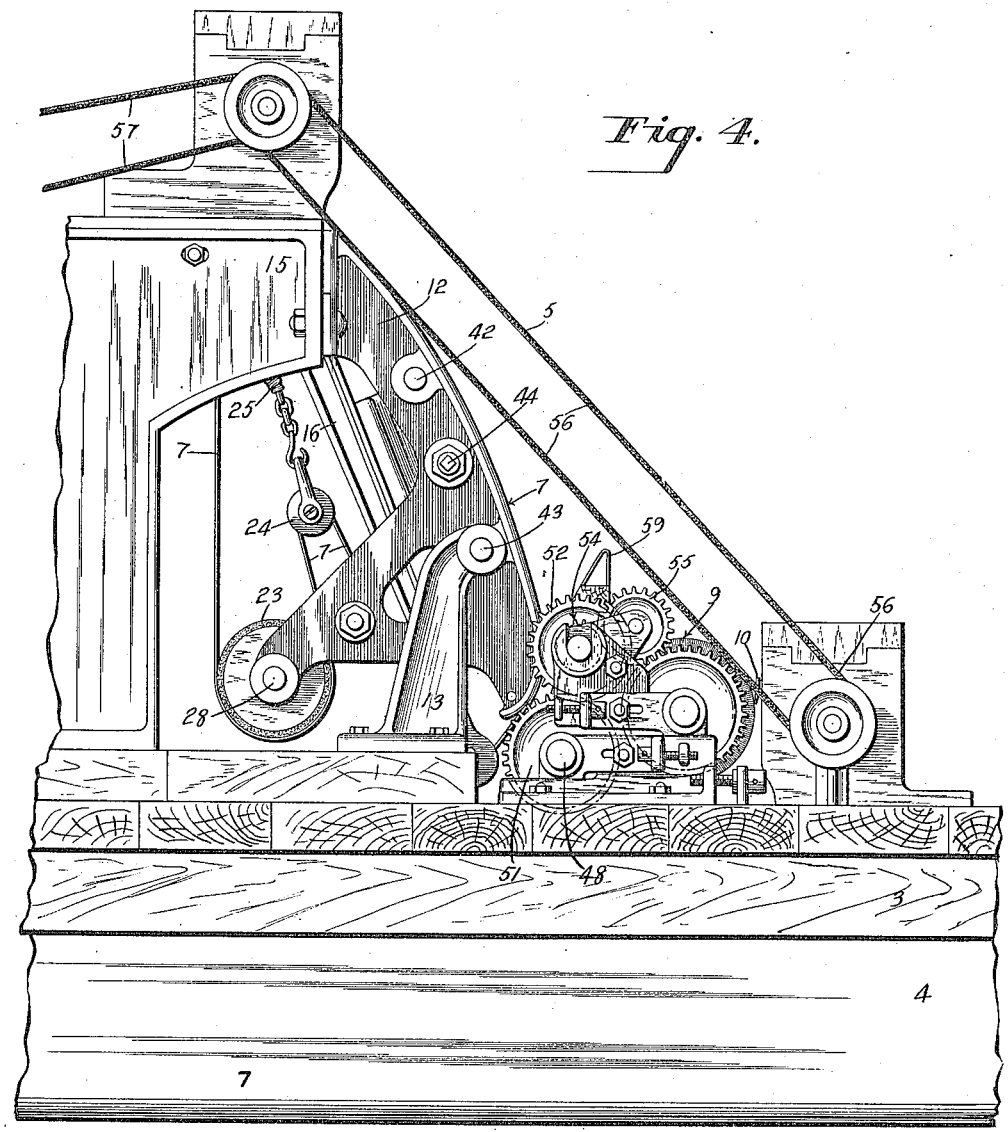

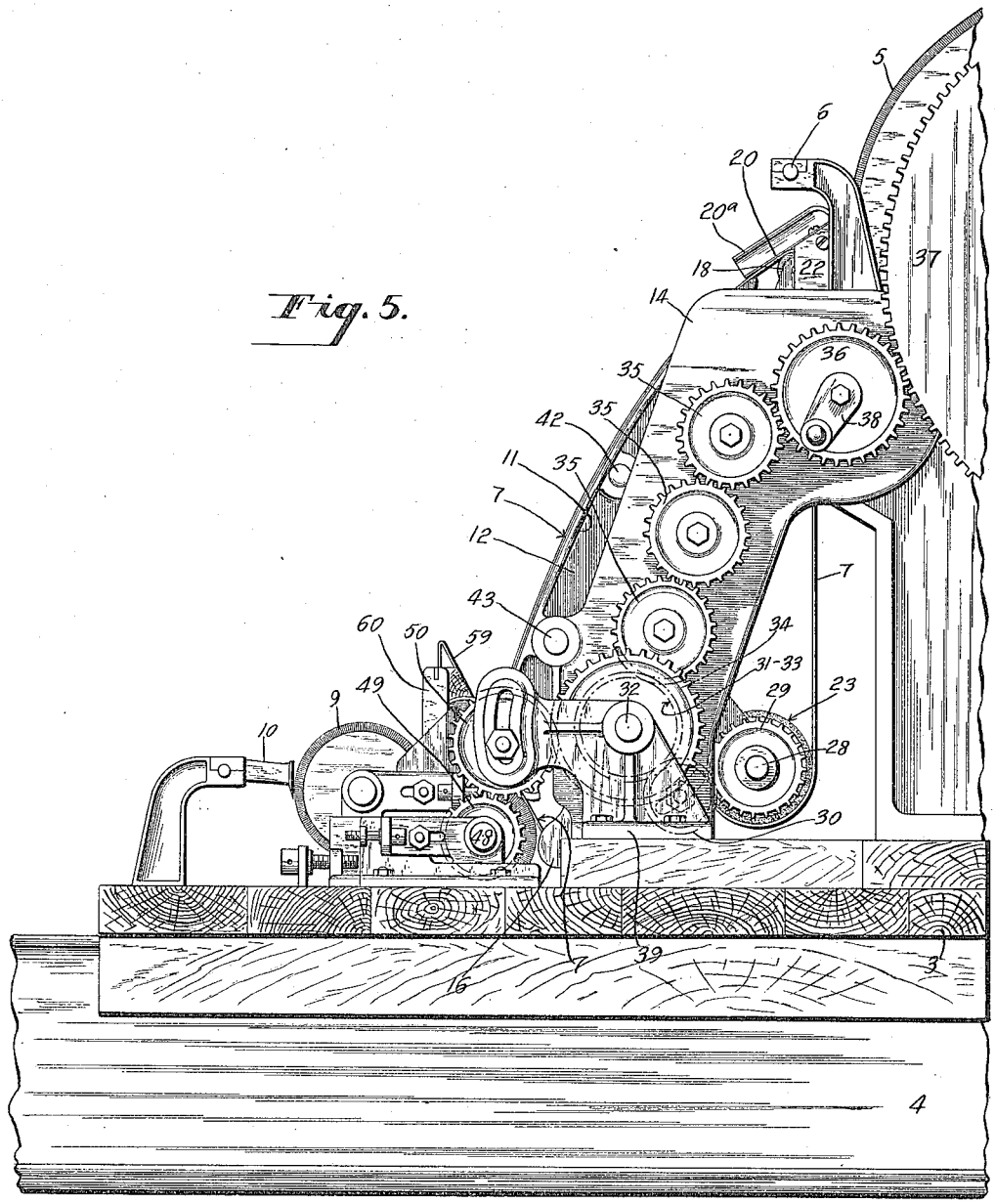

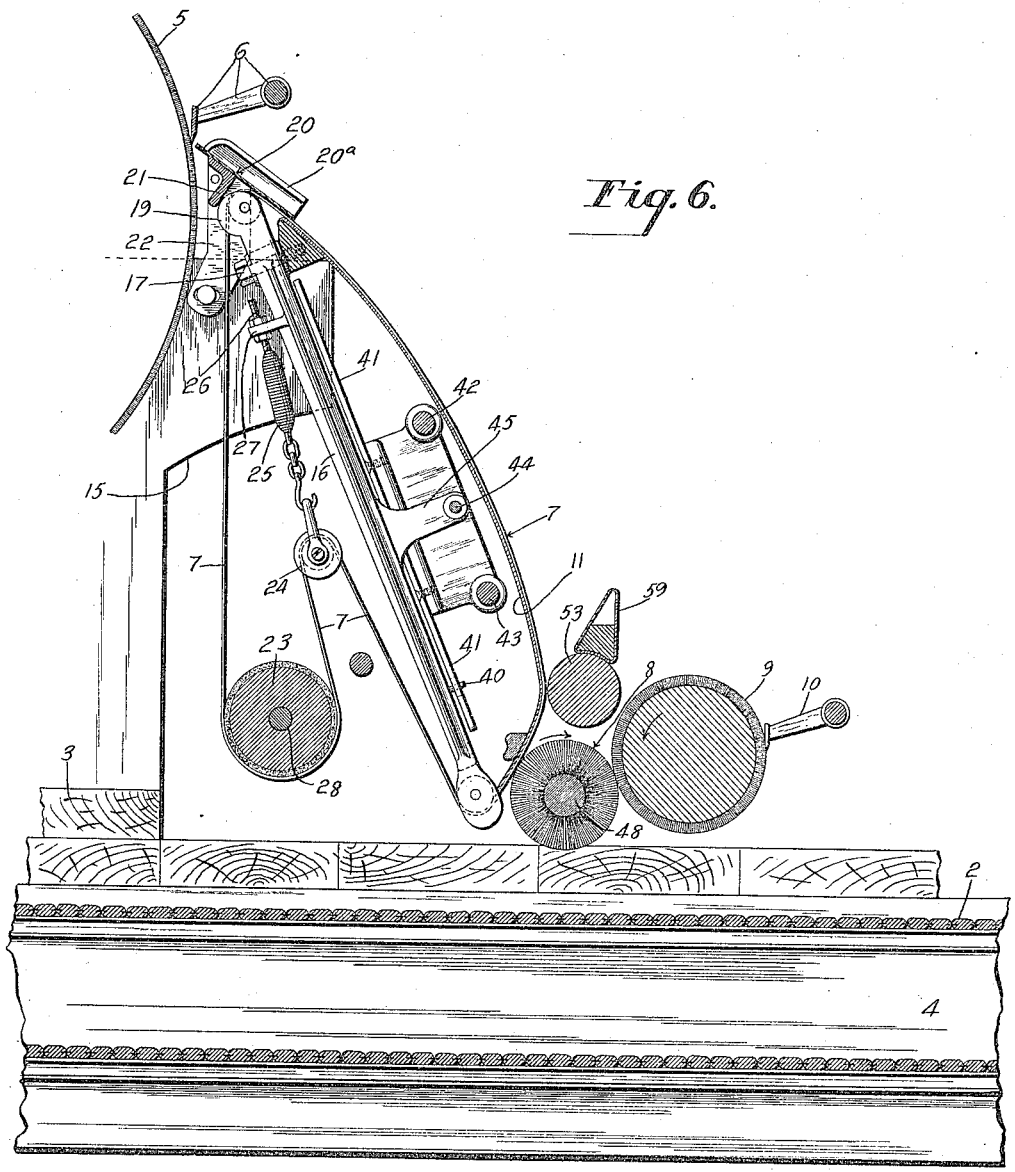

C. A. ALLEN.
CARD FLEECE WIDTH CONTROLLER.
APPLICATION FILED AUG. 21, 1912.
1,152,389.
Patented Sept. 7, 1915.
8 SHEETS—SHEET 6.
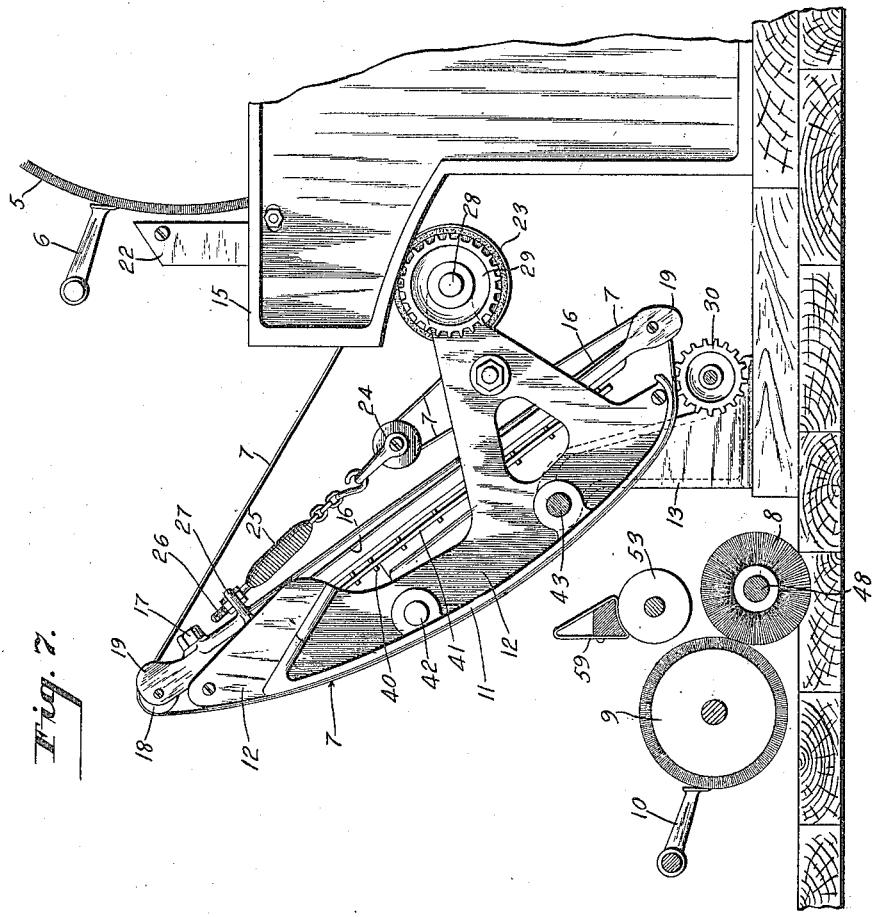

C. A. ALLEN.
CARD FLEECE WIDTH CONTROLLER.
APPLICATION FILED AUG. 21, 1912.
1,152,389.
Patented Sept. 7, 1915.
8 SHEETS—SHEET 7.
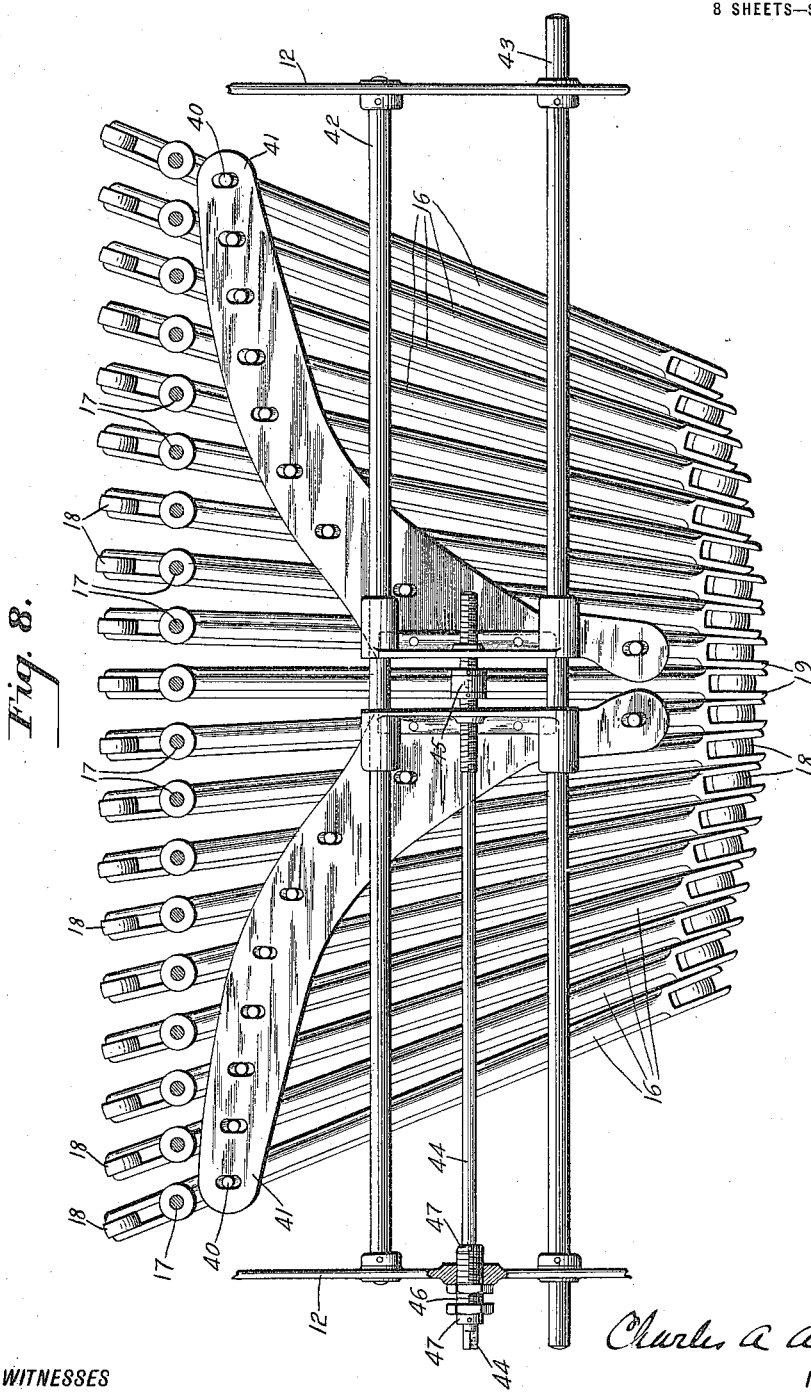

C. A. ALLEN.
CARD FLEECE WIDTH CONTROLLER.
APPLICATION FILED AUG. 21, 1912.
1,152,389.
Patented Sept. 7, 1915.
8 SHEETS—SHEET 8.
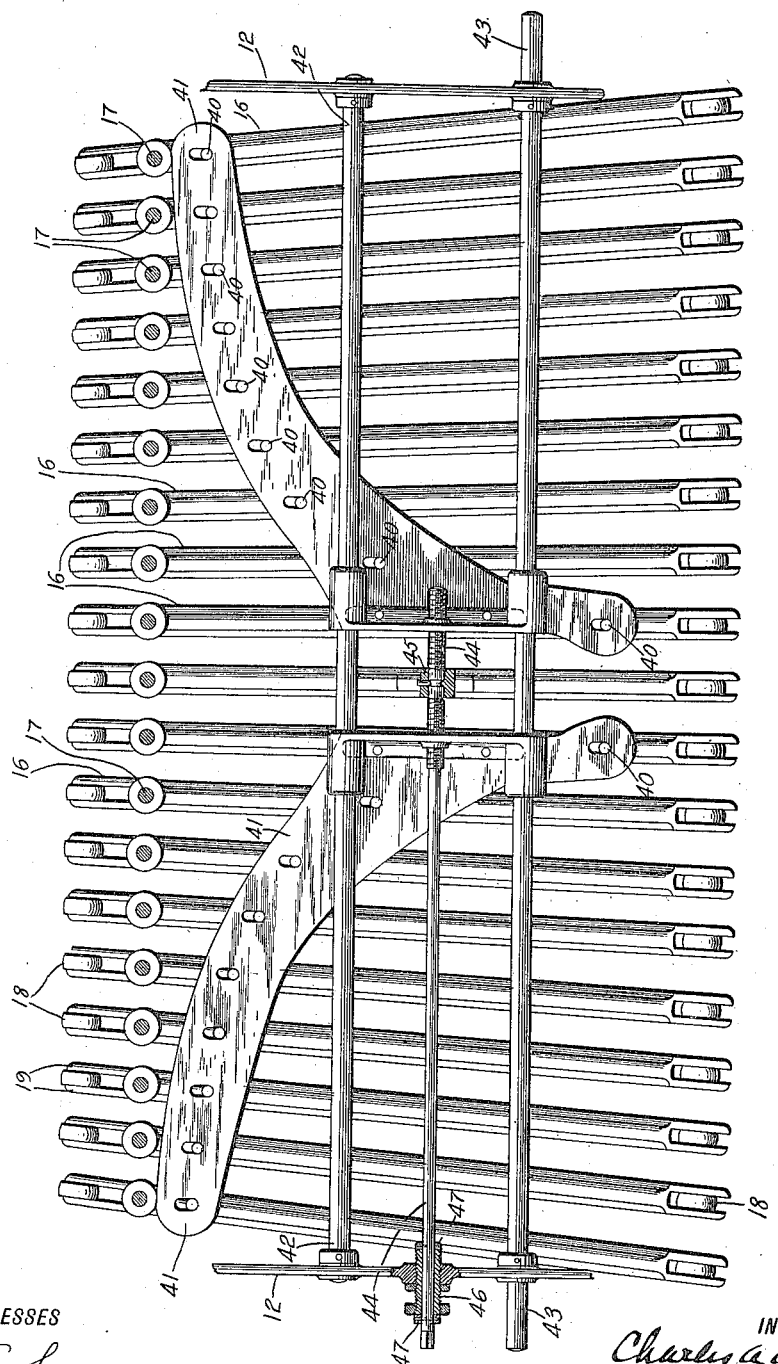
WITNESSES
INVENTOR
Charles A. Allen
BY
ATTORNEYS

UNITED STATES PATENT OFFICE.

CHARLES A. ALLEN, OF WHITINSVILLE, MASSACHUSETTS, ASSIGNOR TO THE WHITIN MACHINE WORKS, OF WHITINSVILLE, MASSACHUSETTS, A CORPORATION OF MASSACHUSETTS.

CARD-FLEECE-WIDTH CONTROLLER.

1,152,389.        Specification of Letters Patent.        Patented Sept. 7, 1915.

Application filed August 21, 1912. Serial No. 716,139.

*To all whom it may concern:*

Be it known that I, CHARLES A. ALLEN, a citizen of the United States, residing in Whitinsville, in the county of Worcester and State of Massachusetts, have invented the following-described Improvement in Card-Fleece-Width Controllers.

The invention is an apparatus for controlling the width of the fleece delivered by carding machines and is specially applicable as an appliance or attachment to be used with or as a part of the carding machines that are used in apparatus for making cotton wadding.

To this end the invention in its preferred form consists of a card-front which can be applied to existing cards with but slight alteration of the latter and which will serve either to expand or contract the fleece delivered by the card as desired.

The principle of operation of the invention will be apparent from the construction of said preferred form, as described below in connection with the eight sheets of drawings forming part hereof and in which—

Figure 1 is a perspective view of an ordinary card equipped with a fleece-controlling card front such as referred to, and mounted on an elevated platform to accommodate the passage underneath it of the traveling conveyer which receives the fleece after its change in width. Fig. 2 is a diagram representing a series of cards equipped with like card fronts, each adapted to deliver its fleece to the traveling conveyer, in superposition with others. Fig. 3 is a front elevation of the card front shown in Fig. 1, with parts broken out and the conveyer shown in section. Fig. 4 is a side elevation of such front from the same side as viewed in Fig. 1. Fig. 5 is a similar elevation from the opposite side, the gear casing being removed. Fig. 6 is a longitudinal vertical section through the central portion of the device. Fig. 7 is a section on line VII—VII, showing the apron and tape driving and controlling mechanism in its turned-back position. Figs. 8 and 9 are details of the tape guides in their positions in which they are placed for reducing and for expanding the width of the fleece, respectively, being views looking rearwardly at such guides with the apron removed and the guide pivots in section.

Referring first to Fig. 2, the apparatus there represented comprises a series of any desired number of cards 1 placed above a traveling belt or conveyer 2, and delivering their respective fleeces in superposition upon it. Upon this conveyer the superposed fleeces are carried to the folding or lapping mechanism, not shown in the figure, or to such other apparatus as may be employed to finish the wadding. While the cards could be placed at the side of the conveyer, it is preferred to mount them one behind the other and directly over it, for which purpose they are set on a framework 3 and the beams 4, as shown in Figs. 1 and 3.

The card-front apparatus is adapted to be mounted directly in front of the doffing cylinder 5 of the card, in the place where the coiling mechanism is normally located, so that it may receive the freshly formed fleece as it leaves the doffer 6. The front may, if desired, be built into the main frame of the card, but in the case taken for illustration it is supported independently on a platform in the position stated, being arranged to be driven from the card however, through a train of gearing referred to below.

The apparatus consists essentially of a series of fleece-conducting members, such as the endless bands or tapes 7 which are suitably supported and spaced apart so as, together, to constitute a tape-formed, fleece-conducting surface of substantially the width at one end of the card cylinder, and at the other, of the fleece to be produced. The tapes are driven on their supporting means so that they carry the fleece away from beneath the card doffer 6, and by virtue of the arrangement or previous adjustment of the courses over which each moves, and the contact that each has with the under side of the fleece, they operate to contract or even to expand the width of the fleece, as may be desired. The courses which the tapes follow are convergent either toward one end or the other, according as the fleece is to be contracted or expanded, and in the preferred embodiment the said courses are adjustable so that they can be set at different degrees of convergence to deliver a fleece which is of any width desired, less or greater than, or the same as, the card cylinder. The number and uniformity of arrangement of the tape surfaces prescribe a correspondingly uniform expansion or contraction of the fleece, which may thus be delivered directly onto a conveyer such as the conveyer 2 if preferred. The invention, however, contemplates the addition to and use with such fleece-width-controlling means of a delivery means adapted to improve further the uniformity of the fleece. This means operates by reforming and redoffing the fleece in the same reduced or expanded condition as it leaves the delivery end of the tape surface, and comprises a rotary brush 8, which transfers the fleece to a card-clothed cylinder 9 from which it is doffed by an oscillating doffer knife 10, falling thence directly onto the conveyer 2.

Referring to the construction of the fleece conducting and changing mechanism, the several tapes 7 are mounted to move through their operating courses or stretches on the smooth upper curved surface of an apron 11, which not only forms the support for the tapes but also the support for the driving means thereof and the means whereby the degree of their convergence can be varied. To this purpose the apron is provided with side members 12 constituting a frame-work for the said parts, which is pivoted on the standard 13 at one side and on a frame plate 14 at the other, so that it can swing or tilt forwardly on a horizontal or transverse axis as indicated in some of the figures of the drawings. When tilted forward all of the tape controlling parts housed beneath or within the apron front are disclosed to view. When in its normal position, the top of the front is bolted to the ends of the card-frame 15, as shown in Fig. 3, and when in this position the apron extends forwardly and downwardly from the card doffer 6 to the receiving brush 8. In the under side of the apron 11, the tapes are guided on a series of guide frames or levers 16, each of which is hung on a pivot bolt 17, which latter are screwed into the cross-bar of the apron, in a row, near the top. (See Figs. 8 and 9.) At their upper and lower ends the guides 16 are bifurcated to accommodate the tape-pulleys 18, which are flat-faced pulleys journaled in the bifurcation so that the projecting cheeks 19, serve to hold the pulleys on them. The space that would be occupied by flange pulleys is thus saved, and the top pulleys are thereby enabled to deliver their tapes directly to the top surface of the curved apron in a plane which is coincident or tangential thereto, and without encroaching on the conductor plate 20 immediately thereabove. This plate 20 carrying the selvage guides 20$^a$ is removably mounted on a cross-bar 21, carried on end brackets 22 secured to the card-frame 15, and its function is to cover the tape pulleys and bridge the gap between the doffer cylinder 5 and the tapes. The tapes 7, being trained over the curved front of the apron as well as over the pulleys of their guide levers 16, as just stated, are also trained over a common driving drum 23 and over a series of take-up pulleys 24, each of which is put under adjustable spring tension by a spring 25, which latter has a threaded shank 26 attached to a lug 27 on each of the respective guide levers. The tapes are thus brought into proper contact under all conditions of adjustment, to be driven by their driving drum and impelled across the face of the apron. The tape drum is journaled in the rearward arms of the apron frame, its axle 28 projecting beyond one of the arms and carrying a spur gear 29, by which it is driven. When the frame is in its operative position this gear 29 meshes with a drive pinion 30, which is in turn driven by a spur gear 31 (Fig. 3) through a gear train comprising the following:—a shaft 32, to which the gears 31 and 33 as well as the gear 34 are secured, a train of gears marked 35 which drives the gear 33 and the shaft 32, and the gear 36 which connects the train with the doffer cylinder gear 37 and is provided with a handle 38 by which it may be thrown out of mesh therewith to disconnect the whole card front from the driving action of the card. The said train of gears and the shaft 32 are mounted on the plate 14 above referred to as well as upon an auxiliary standard 39, but it will be evident that any suitable means may be employed for their proper support or for the drive of the card front. In the present case the drive pinion 30 is adjustably mounted on the frame plate so that it may accommodate different sizes of tape drum gears 29 interchangeably mountable on the drum shaft 28 to vary the speed of the tapes.

When the apron is tilted back on its axis, as shown in Fig. 7, the drum gear 29 abuts against the overhanging card frame 15 forming a stop for the apron.

The positions of the tapes on the apron and their degree of convergence thereon, is determined by the relative positions of their respective guide levers 16, which can be shifted, as desired, by swinging them, as well as their spring-pulled take-ups, on the pivot bolts 17. The illustrated mechanism for this purpose comprises means which are subject to convenient manual control, to impart an increasing degree of movement to the successive guide levers counted from the center to the sides, so that all of them will thus be maintained convergent to substantially a single point, except, of course, when adjusted in parallelism, and it also comprises means for bodily adjusting the whole series of levers, whereby the delivery of the fleece can be accurately set to coincide in exact registry with some other fleece deposited on the conveyer 2 from another card.

Each of the guide levers, except the central one, is provided with a forward stud 40, the studs being arranged at progressively greater distances from the pivot bolt of each lever, on each succeeding lever, from the center to the sides, and as plainly shown in Figs. 8 and 9. For the set of levers on each side of the center, there is provided an actuating plate 41 engaging the said studs and mounted to slide on two cross-shafts 42 and 43 secured to the side frames 12 of the apron. The projected ends of the lower of these shafts form the trunnions by which the apron is tiltably mounted on the standard 13 and the gear plate 14 as above described. The two actuating plates 41 are threaded to a double-pitch screw shaft 44, which is rotatably mounted between its opposite threads in a thrust collar 45, secured to the central guide-lever, such collar being provided with suitable means to prevent endwise movement of the screw-shaft relatively to it. The said screw-shaft is also mounted rotatably in a bushing 46, in which it is held against endwise movement by two thrust collars 47. The bushing is threaded into the side frame 12 and provided with a spanner hole as well as a pair of jamnuts, from which it will be seen that the screw-shaft 44 is capable of endwise adjustment by appropriately operating the threaded bushing and that such endwise adjustment will produce corresponding lateral adjustment of the center guide-lever and, through the actuator plates, of all of the levers in the series. By rotating the screw shaft in the bushing, as by means of a crank on its square end, the actuator plates may be caused to recede or approach and thereby impart angular movements to the levers corresponding to the distances of their respective studs 40 from their pivots. As above stated these distances are selected so as to preserve uniform convergence for all adjustments, but it will be evident that an approximation to uniformity can be obtained with less complicated apparatus and without, for instance, imparting a geometrically proportionate movement to each individual lever.

Fig. 8 shows the levers in the extreme position for contracting the width of the fleece; Fig. 9 shows the opposite convergence for expanding the fleece, as will now be readily understood.

The delivery mechanism, which also reforms the reduced or expanded fleece, is mounted directly in front of the lower end of the tape-surface, on standards which are independently adjustable toward and from the same. Such adjustment is mainly to take up for wear on the brush bristles, and the particular features thereof being matters of ordinary employment will not require description. The shaft 48 of the brush 8 carries a gear 49, meshing with an adjustable gear 50, which is driven by the gear 34 above referred to and from it receives motion in the same direction as the tape drum. At its opposite end the brush shaft 48 carries a gear 51, driving the gear 52 of a guide-roll 52 mounted directly above the brush and close against the tapes. Through the pinion 54, compounded with gear 52, and the idler 55, the brush drives the doffer cylinder 9. The direction of motion and relative speeds are such that the fleece is taken from the tapes by the brush, beneath the guide-roll 53 and carried over in the direction of the arrow and deposited on the doffer cylinder, which carries it downwardly and around to its front side where it is combed off as a fresh and perfect fleece, by the oscillating doffer-knife 10. This knife and the main card doffer knife 6, are driven by belts 56 and 57, from the card pulley 58 (Fig. 1) and may be constructed according to any usual design. The guide-roll 53 is provided with a clearer cover 59 held in position thereon by a light cross-bar and framework 60, as shown in Fig. 3.

The brush 8 preferably rotates at a slightly less surface speed than the tapes though it may operate at the same or a higher speed. In taking the fleece from the tapes and placing it upon the doffer cylinder, the original fleece becomes thereby virtually formed over again, and any possible inequalities in its thickness due to extreme expansions or contractions, are thereby eliminated, and the selvage particularly is reformed in a clean and regular condition. The width however remains the same as delivered by the tapes, and by the adjustments provided can be accommodated quickly and while the front is in operation, to any condition required. By bodily shifting all the tapes to the right or left, an exact superposition of fleeces can be obtained on the conveyer, from which fact in particular it will be observed that the utility of the new apparatus is not confined solely to the reduction or expansion of the width of the fleece upon which it acts.

It will be plain to those familiar with the art that the specific forms of the parts above described, and particularly the framing and card mounting, can be widely varied from that illustrated and described herein and without change in the principle of the invention, and further, that the specific fleece width-controlling means can be used with any other suitable means for reforming the fleece or without any means at all, and also that various rearrangements of the dimensions and proportions and of the driving gearing can be resorted to without affecting the principle of operation or departing from the substance of the invention.

I claim:—

1. In apparatus for making cotton wadding, the combination of a series of cards provided with a conveyer receiving the fleeces thereof in superposition and each provided with fleece conducting means between itself and such conveyer comprising multiple surfaces moving in convergent lines and adapted to change the width of the fleece passing thereon toward said conveyer.

2. In apparatus for making cotton wadding, a series of cards combined with a conveyer common to the series and with fleece controlling card-fronts comprising means for changing the width of the fleeces and a cylinder and doffer knife for delivering the changed fleeces in superposition upon such conveyer.

3. In apparatus for making cotton wadding, the combination of a series of cards, a conveyer common to the series adapted to receive the fleeces therefrom in superposed relation and means comprising a series of moving surfaces for changing the width of such fleeces in transit from the card to the conveyer.

4. In apparatus for making cotton wadding, the combination of a series of cards, a conveyer common to the series arranged to receive the fleeces therefrom in superposed relation and a card-front operative to change the width of each of such fleeces in its passage to the conveyer and means for adjusting such front to control the degree of such change.

5. A fleece width-controlling means for cards comprising a plurality of surfaces forming the support for the fleece which leaves the card doffer and arranged to move in non-parallel directions away from such doffer whereby the said fleece is changed in width.

6. A fleece width controller for cards comprising a plurality of fleece-supporting surfaces, upon or over which the fleece moves in leaving the doffer of the card and means for imparting to such surfaces a motion which comprises movement, lateral or transverse, to the general direction of fleece delivery and which thereby operates to change the width of the fleece departing therefrom.

7. A card-fleece width controller comprising an apron or frame member located to receive the fleece from the card doffer and provided with a number of moving members presenting surfaces adapted to engage and support the fleece, such members being disposed in distributed relation on said apron, and means for imparting motion to such members to change the width of the fleece conducted thereby.

8. A card fleece width controller comprising a series of convergingly arranged endless belt conveyers located to receive and conduct the fleece delivered by the card doffer, a support on which such conveyers are mounted in a distributed relation, and means for imparting motion to such conveyers whereby the fleece is changed in width.

9. A card fleece width controller comprising, a series of moving independent surfaces receiving the fleece from the card doffer and moving in directions away from the doffer and in convergent lines to change the width of such fleece, and in means for varying the convergence of their said directions of movement.

10. A card-fleece width-controller, consisting of a card front provided with a fleece conducting surface adapted to change the width of the fleece conducted thereover and a member adapted for manual adjustment to vary the degree of such change.

11. A card-fleece width-controller consisting of a card-front having fleece-conducting means adapted to reduce the width of the fleece and means for adjusting said front to cause it to expand the said fleece.

12. A card-fleece width-controller comprising a series of suitably supported moving tapes together forming a conveying surface by which the fleece is changed in width, and means for altering the relative operative positions of such tapes to vary the width of the fleece delivered therefrom.

13. In a card, means for changing the width of the fleece comprising a series of tape-like conveyers suitably driven to carry the card fleece away from the card doffer, the width of such series of conveyers at its fleece-receiving end being substantially equal to the card cylinder, and means for laterally changing the positions of such conveyers at the delivery end of the said series.

14. A card fleece width controller comprising a series of fleece-conducting members adapted to receive and conduct the card fleece away from the card doffer, the width of such series being substantially constant at its receiving end, and means for variably and simultaneously enlarging all the spaces between adjacent fleece-conducting members at their delivery, whereby the said members may have substantially uniform width-changing action on the fleece for their different width adjustments.

15. In a card-fleece width-controller, means for changing the width of the fleece emerging from the card doffer and a delivery means therefor comprising a doffing cylinder receiving the changed fleece and a doffer knife discharging the same therefrom.

16. A card-front comprising in combination means for changing the width of the fleece delivered by the card doffer, means for reforming such changed fleece in its new width, and means including a doffer knife, for discharging the fleece as thus reformed.

17. A card-front comprising in combination, means for changing the width of the fleece delivered by the card doffer, means for varying the extent of such change, and means for reforming the fleece in its new width.

18. A card-front comprising a series of convergent tapes, suitably supported and driven to conduct the fleece from the card doffer, a rotary brush at the delivery ends of said tapes, a doffing cylinder coöperating with the brush and means for discharging a fleece from said cylinder.

19. A card-front comprising in combination means for changing the width of the fleece delivered by the card doffer, a brush receiving the fleece in its new width from such means, and means for doffing the fleece from the brush.

20. In apparatus for making cotton wadding, the combination of a series of cards, a conveyer common thereto and a series of card-fronts each comprising fleece-width-changing and reforming mechanism, adapted to deliver the reformed fleece to said conveyer.

21. In combination with a card, a card-front comprising fleece-reducing and reforming and discharging mechanism operating to discharge a fleece of different width and gearing connecting the same for operation by the card.

22. A card-front comprising means for changing the width of the fleece, gearing connecting the same for operation by the card and a movably mounted frame for such width-changing means adapting the same to be moved into and out of connection with said gearing.

23. A card-front for changing the width of the delivered fleece comprising an apron movably mounted with respect to the card and forming the support for a plurality of convergently arranged fleece-conducting tapes, means for driving such tapes, whereby the fleece thereon becomes changed in width according to the degree of convergence thereof.

24. A card front for changing the width of the fleece comprising a frame movably mounted with respect to the card and supporting a plurality of convergently arranged and moving surfaces, whereby the fleece is conducted away from the card doffer, in combination with means receiving the fleece from such surfaces adapted to reform and discharge the same in the same width as received.

25. A card-front for changing the width of the fleece, comprising an apron supporting a plurality of fleece conducting tapes, disposed convergently, means on the opposite side of such apron for taking up the slack in such tapes, and means for driving the tapes.

26. A card-front comprising a tilting apron, a series of tapes mounted to move thereon to carry the fleece away from the doffer, take-ups for such tapes mounted underneath the tilting apron, and means for driving the tapes along the apron.

27. A card-front comprising an apron, a plurality of fleece-receiving and conducting tapes moving thereon, and means for contracting or expanding the spaces between the tapes to control the width of the fleece delivered thereby, a brush receiving the fleece from such tapes, a doffer cylinder receiving the fleece from such brush, and a doffer knife for discharging the same from the cylinder.

28. A card-front for controlling the width of the fleece comprising a series of tapes convergently mounted to receive and conduct the fleece, and a plurality of guide-frames for such tapes determining the positions thereof with respect to the fleece, and means for imparting simultaneous relative adjustment to such guide-frames to vary the convergence of the tapes and the width of the fleece delivered therefrom.

29. In a fleece width-controlling device the combination of a series of fleece-conducting members, a movable guide-frame or support for each member, and adjusting mechanism operable to impart variant motions to the guide-frames on each side of the center whereby said members can be automatically maintained convergent toward substantially the same point.

30. In a width-controlling device a series of moving-conducting members, a pivotally mounted guide for each member, and adjusting mechanism adapted to maintain such members convergent at different angles, but to substantially the same point, comprising a means engaging said members at successively greater distances from their pivots and adapted to shift the same relatively to each other.

31. In a width-controlling device a series of moving conducting members, a pivotally mounted guide for each, and adjusting mechanism therefor, comprising plates engaging the members on each side of the center at successively greater distances from their pivots and a double-pitch screw for operating such plates.

32. In a card-front, a series of moving conducting tapes, an apron forming the support therefor mounted to tilt on a transverse axis whereby its upper end can be moved into and out of position beneath the card doffer, and a movable bridge plate overlapping the top of said apron.

33. In a card-front, an apron extending downwardly from the card doffer, a series of tapes mounted to slide downwardly over the upper face of the apron and having take-ups and driving means in the rear thereof, and adjustable guiding means for such tapes also mounted in the rear of the apron.

34. In a card front, an apron extending downwardly from the card doffer, a series of tapes mounted to slide downwardly over the upper face of the apron, a guide frame pivoted in rear of apron for each tape, a take-up for each tape and a drum common to said tapes for driving the same.

35. In a card front, the combination with a conveyer of a moving fleece-conducting surface adapted to deliver the fleece to said conveyer and means for laterally shifting the delivery end of said moving surface to change the position of the fleece upon said conveyer.

36. In a card front, the combination of means for conducting and changing the width of the fleece, a conveyer to receive such fleece, and means for bodily adjusting the said means laterally of the conveyer.

37. In cotton wadding apparatus the combination with a series of cards, a conveyer common to the series arranged to receive the fleeces therefrom in superposition, and means for shifting the path of the fleeces moving from the card onto the common conveyer, whereby the superposed fleeces thereon may be brought into marginal registry.

38. In a card front, the combination of an apron, a series of tapes mounted to move thereon, a series of flat-faced pulleys conducting such tapes onto the apron, and supports for such pulleys having cheeks in rear thereof to maintain the tapes upon said pulleys.

In testimony whereof, I have signed this specification in the presence of two witnesses.

CHARLES A. ALLEN.

Witnesses:
ROBERT S. METCALF,
OSCAR L. OWEN.

Copies of this patent may be obtained for five cents each, by addressing the "Commissioner of Patents, Washington, D. C."